(12) United States Patent
Maier

(10) Patent No.: US 7,845,879 B2
(45) Date of Patent: Dec. 7, 2010

(54) SOIL STABILIZATION METHOD

(75) Inventor: Terry L. Maier, Detroit Lakes, MN (US)

(73) Assignee: Team Laboratory Chemical Corp., Detroit Lakes, MN (US)

( * ) Notice: Subject to any disclaimer, the term of this patent is extended or adjusted under 35 U.S.C. 154(b) by 0 days.

(21) Appl. No.: 12/630,324

(22) Filed: Dec. 3, 2009

(65) Prior Publication Data

US 2010/0080654 A1 Apr. 1, 2010

Related U.S. Application Data

(62) Division of application No. 11/732,388, filed on Apr. 3, 2007, now Pat. No. 7,651,294.

(60) Provisional application No. 60/789,640, filed on Apr. 6, 2006.

(51) Int. Cl.
*E01C 7/36* (2006.01)
*E01C 21/00* (2006.01)

(52) U.S. Cl. .......................... 404/76; 427/136

(58) Field of Classification Search ............. 404/76; 427/136
See application file for complete search history.

(56) References Cited

U.S. PATENT DOCUMENTS

| 4,106,296 | A | 8/1978 | Leonard, Jr. et al. |
|---|---|---|---|
| 4,293,340 | A | 10/1981 | Metz |
| 4,354,874 | A | 10/1982 | Vickers |
| 4,354,875 | A | 10/1982 | Powers et al. |
| 4,373,958 | A | 2/1983 | Jones et al. |
| 4,384,894 | A | 5/1983 | Vickers et al. |
| 5,577,338 | A | 11/1996 | Matsumoto et al. |
| 5,820,302 | A | 10/1998 | Roberts et al. |
| 6,689,204 | B2 | 2/2004 | Stanley |
| 7,070,709 | B2 | 7/2006 | Schilling et al. |
| 7,651,294 | B2 | 1/2010 | Maier |
| 2002/0123433 | A1* | 9/2002 | Goodhue et al. ............ 507/140 |

OTHER PUBLICATIONS

Soluble Silicate Product Range, INEOS Silicas, issue 1—Dec. 2002—SCT 204, 8 pages.
Local Technical Assistance Program, U.S. Department of Transportation Federal Highway Administration, http://www.ltapt2.org/gravel/gravelroads4.htm, 11 pages.
File History for U.S. Patent No. 7,651,294 B2 A1, issued Jan. 26, 2010.

* cited by examiner

*Primary Examiner*—Raymond W Addie
(74) *Attorney, Agent, or Firm*—Patterson Thuente Christensen Pedersen P.A.

(57) ABSTRACT

A composition comprises a solution of soluble sodium silicate applied at the disclosed application rate to improve the load bearing capacity for a roadway. The method of the invention addresses the application of the disclosed composition to maximize stabilization of road beds.

14 Claims, No Drawings

SOIL STABILIZATION METHOD

REFERENCE TO RELATED APPLICATIONS

The present application is a continuation application of U.S. patent application Ser. No. 11/732,388, filed Apr. 3, 2007, now U.S. Pat. No. 7,651,294 entitled SOIL STABILIZATION METHOD, and claims the benefit of U.S. Provisional Patent Application No. 60/789,640, filed Apr. 6, 2006, each hereby incorporated in its entirety by this reference. The present application is also related to co-pending U.S. patent application Ser. No. 12/630,301, filed Dec. 3, 2009 entitled SOIL STABILIZATION METHOD, which has the same inventor as the present application.

FIELD OF THE INVENTION

The present invention relates to reconstructing and paving roads. More specifically, the present invention is method of using a soluble sodium silicate composition to stabilize soil for a road base or sub-base applicable to the construction of new roads and the reconstruction or reinforcement of existing roads.

BACKGROUND OF THE INVENTION

Construction and maintenance of roads, especially secondary roads, requires a solid, stabilized base and sub-base on which to place the road surface. Preparation for road paving generally includes compaction of the base or sub-base, which may comprise clay, gravel, crushed stone, and the like, either taken from the native materials or transported to the site. Frequently, the base material includes crushed concrete and asphalt from the old road base or surface. Whether the material is primarily reclaimed from an old road surface material, taken from a new or old base on site, or is made from materials transported to the site, maximizing the stability of the material increases the longevity of the road surface and decreases the frequency and cost of repairs.

Soils too weak to bear the anticipated load can be stabilized by the addition of materials which impart mechanical strength, such as aggregate, and by the addition of chemical stabilizers, which decrease water absorption and increase the cohesion of the soil matrix by forming a cement-like compound to hold the matrix together. The appropriate type of stabilization and results to be expected depend upon the soil types encountered and methods of application of the stabilizer and construction of the road. A range of soil compositions can serve as good road base material, but high strength, resistance to shear, and resistance to erosion or swelling by water are required. Most native soils require some extent of stabilization to achieve the goals and provide a proper material for road construction.

Failure to provide an adequately stabilized base results in frequent and expensive repairs. Various techniques and compounds are known for stabilizing the soil or fill beneath pavement or other construction to provide a stable, high integrity base on which to place the pavement or other construction. Materials commonly used for this purpose include lime and fly-ash mixtures, calcium chloride, sodium silicates, mixtures of molasses and fuel oil, calcium acrylate, lignin sulfonate, and other materials.

Chlorides are the most commonly used product for soil stabilization. Calcium chloride assists in the compactive process, making it possible to obtain greater densities and greater strengths with normal compactive efforts. A major limitation of calcium chloride is its narrow application range. If the calcium chloride solution is applied at a less than specific dilution ratio the effectiveness of the compound is diminished, while application at a higher than necessitated dilution ratio causes beading on the application surface and thus prevents treatment of the target soil. Further, the widespread use of large quantities of chlorides has been shown to be environmentally harmful. Finally, chlorides are extremely corrosive on road construction and maintenance equipment.

Resins available under various commercial names are used as soil stabilizers and typically comprise lignin sulfonate, which is a by-product of the pulp milling industry. Lignin sulfonate is also referred to as "tree sap" by those skilled in the art of road construction. They provide cohesion to bind soil particles together, but are primarily used when they can be incorporated into the surface gravel.

Additives used for roadbed stabilization are disclosed by U.S. Pat. No. 4,106,296 (epoxy resins), U.S. Pat. No. 4,373,958 (lime kiln dust), U.S. Pat. No. 5,577,338 (fly ash), U.S. Pat. No. 5,820,302 (silicate and cement), and U.S. Pat. No. 6,689,204 (potassium formate and cationic polymer), all of which are incorporated herein by reference. U.S. Pat. No. 7,070,709, incorporated herein by reference, discloses various prior art compositions used for soil stabilization. Those products, however, have numerous disadvantages such as poor longevity, high cost, and environmental toxicity. The trade-offs are either accepting the environmental issues that come with products of longer useful life; dealing with a shorter lifespan for an environmentally friendly product; or paying significantly more for environmentally safe products with a favorable useful life.

A more acceptable method of roadbed stabilization is needed. It is an object of this invention to provide an improved composition and method of using the improved composition for soil stabilization that is both economical and environmentally sound.

SUMMARY OF THE INVENTION

The present invention is directed to a method of using a composition to provide solid, stabilized, and extremely hard bases and sub-bases for road construction. The composition is generally comprised of a soluble sodium silicate which, applied at the disclosed application rate, improves the load bearing capacity for a given roadway at a faction of the cost of existing materials. The method of the invention addresses the application of the disclosed composition to maximize stabilization of roadbeds. The present invention addresses drawbacks experienced with the prior art because it provides an effective road stabilizer that is both economical and environmentally friendly.

DETAILED DESCRIPTION OF THE PREFERRED EMBODIMENTS

The following descriptions of the present invention have been simplified to illustrate elements that are relevant for a clear understanding of the present invention. The descriptions eliminate, for purposes of clarity, elements found in typical soil stabilizers and detailed explanations of procedures used in road construction. Those of ordinary skill in the art will recognize that other elements of both the composition and method may be desirable or necessary to implement the present invention. Because such elements are well known in the art and do not facilitate a clearer understanding of present invention, a description of such elements may not be provided herein.

The stabilizer of the present invention comprises a nontoxic, water soluble chemical composition used as a material stabilizer for road bases. The disclosed stabilizer generally comprises a soluble sodium silicate in a water base, otherwise known as "waterglass." The preferred embodiment of the stabilizer contemplates an aqueous solution consisting of 28-30 percent silicon dioxide by weight and 8.5-9.5 percent sodium oxide by weight with an overall specific gravity ranging from 1.37 to 1.42 and an average viscosity of 150 at 20° C. The average weight ratio of silicon dioxide to sodium oxide for the stabilizer should be between 3.1 and 3.4. A commercial version of the stabilizer is available from INEOS Silicas Americas located in Joliet, Ill. under the trade name Crystal® 78.

Application of the stabilizer of the present invention is accomplished by the use of conventional spray equipment known in the art of road construction and maintenance. It may be gravity fed or pumped through hoses, spray nozzles, or fixed sprayers to uniformly apply the compound to the material to be treated. Motor-graders, asphalt grinders, mixers, pug mills, compactors, rollers, and other conventional road construction equipment may be utilized to blend, set grade, and compact the stabilized base.

A preferred embodiment of the present invention includes the application of the stabilizer at three steps of the road bed construction at specific application rates. In the preferred embodiment, it is recommended that the road bed be laid in sections of ¼ to ½ mile in length. Once the road bed has been leveled and the bed construction material has been windrowed along the road, the road bed is prepared by applying stabilizer to the road bed at a rate of 20-25 gallons per mile of 24'-30' width road surface. The amount of water in which the stabilizer is diluted will depend upon the type of applicator used, size of the water truck, and the weather conditions (temperature, humidity, wind). The typical recommended dilution is about 55 gallons of stabilizer per 5,000 gallons of clean water. After the initial application of the stabilizer, the road bed should be compacted by any of the various methods known in the art of road construction.

The second step of the preferred embodiment involves applying material from the windrow to the road bed in one- to two-inch lifts. As the grader is laying material from the windrow across the road, the stabilizer is applied to the lift and then mixed into the material placed upon the road bed. The amount of stabilizer applied per lift will depend upon the number of lifts to be used in the road bed construction. A total of 220 gallons of stabilizer should be used for each mile of 24'-30' width of road surface assuming a total bed thickness of three to four inches. The amount of water used for the application of the 220 gallons of stabilizer per mile will depend upon the type of applicator used, size of the water truck, and the weather conditions. Each lift of mixed material and stabilizer should be well mixed and compacted by any of the methods known in the art prior to application of the next lift. This process is repeated until all lifts have been applied (windrow has been completely used) and well compacted. The finish grade and slope of the bed should then be prepared.

The third step of the preferred embodiment is finishing off the road bed surface with additional stabilizer. The stabilizer is applied to the finished bed at a rate of 25-30 gallons per mile of 24'-30' width road surface. Compaction of the road surface should continue until the surface is dry. As with the previous steps, the amount of water used to dilute the 25-30 gallons of stabilizer will depend upon the type of applicator used, the size of the water truck, and the weather conditions.

The preferred embodiment also contemplates keeping the working surfaces wet while compacting. The appropriate amount of moisture for working road compaction is well known by those in the art of road construction. It is recommended that compactors constantly work the road to maximize the hardening provided by the stabilizer. Roadways may be further enhanced by the application of a sealant to protect the new road bed from the elements. The preferred embodiment contemplates using a seal coating process such as the application of a bituminous chip seal.

As road widths vary, the present invention contemplates using the following total stabilizer amounts for all three steps per mile of road at the ratios described herein:

| Road Bed Surface Width (Feet) | Amount of Stabilizer (Gallons) |
|---|---|
| 24-30 | 275 |
| 31-37 | 330 |
| 38-44 | 385 |
| 45-51 | 440 |

While the present invention may be used for a wide variety of aggregate mixtures comprising clay material, caliche soils, and sandy loam with low sand content, it is recommended that the soil used in constructing the road bed consist of a good binding material with aggregate large enough to provide a driving surface. Examples of aggregate gradation that provide exceptional results are provided below:

| Example A | | Example B | |
|---|---|---|---|
| Sieve Size | % Passing | Sieve Size | % Passing |
| 1" | 100 | 1" | 100 |
| 3/4" | 100 | 3/4" | 100 |
| 3/8" | 65-95 | 3/8" | 50-85 |
| #4 | 40-85 | #4 | 35-80 |
| #10 | 20-70 | #10 | 20-70 |
| #40 | 10-45 | #40 | 10-40 |
| #200 | 10-15 | #200 | 10-15 |

| Example C | | Example D | |
|---|---|---|---|
| Sieve Size | % Passing | Sieve Size | % Passing |
| 1" | 100 | 3/4" | 100 |
| 3/4" | 95-100 | #4 | 38-75 |
| 3/8" | 65-95 | #8 | 22-62 |
| #4 | 40-75 | #30 | 12-37 |
| #10 | 25-70 | #200 | 8-15 |
| #40 | 10-45 | | |
| #200 | 10-15 | | |

The material passing through the #200 sieve should be binding-type material such as clay and not silt.

The present invention may be embodied in other specific forms without departing from the spirit of any of the essential attributes thereof; therefore, the illustrated embodiment should be considered in all respects as illustrative and not restrictive, reference being made to the appended claims rather than to the foregoing description to indicate the scope of the invention.

What is claimed is:

1. A method of full-depth road reclamation comprising:
   crushing an existing flexible pavement section and predetermined portion of underlying road bed;
   pulverizing the crushed flexible pavement section and predetermined portion of underlying road bed;

uniformly blending the pulverized flexible pavement section and predetermined portion of underlying road bed;

providing a soil stabilizer comprising 28-30 percent silicon dioxide by weight and 8.5-9.5 percent sodium oxide by weight in an aqueous solution; and applying the soil stabilizer to the uniformly blended flexible pavement section and predetermined portion of underlying road bed in two steps, the steps comprising:

(i) a first step of applying a mixture of the crushed, pulverized, and uniformly blended flexible pavement section and underlying road bed and the soil stabilizer to the road bed at a rate of one gallon of the soil stabilizer per every 42-74 square yards of road surface; and (ii) a second step of applying the soil stabilizer to the road bed at a rate of one gallon of the soil stabilizer per every 275-700 square yards of road surface.

2. The method of claim 1 wherein the road bed is compacted after each of the steps of applying the soil stabilizer.

3. The method of claim 2 wherein the grade and slope of the road bed is finished before the second step of applying the soil stabilizer.

4. The method of claim 3 wherein the road bed is compacted after the second step of applying the soil stabilizer until the surface of the road bed is dry.

5. The method of claim 4 wherein the soil stabilizer is diluted in a ratio of about one 55-gallon drum of the soil stabilizer per 5,000 gallons of water before the two application steps.

6. The method of claim 1 wherein the providing step comprises providing a soil stabilizer comprising about 28.4 percent silicon dioxide by weight and about 8.7 percent sodium oxide by weight in an aqueous solution.

7. A method of full-depth road reclamation comprising:

crushing an existing flexible pavement section and predetermined portion of underlying road bed;

pulverizing the crushed flexible pavement section and predetermined portion of underlying road bed;

uniformly blending the pulverized flexible pavement section and predetermined portion of underlying road bed;

providing a soil stabilizer comprising silicon dioxide and sodium oxide wherein the average weight ratio of silicon dioxide to sodium oxide is between 3.2 and 3.3; and applying the soil stabilizer to the uniformly blended flexible pavement section and predetermined portion of underlying road bed in two steps, the steps comprising:

(i) a first step of applying a mixture of the crushed, pulverized, and uniformly blended flexible pavement section and underlying road bed and the soil stabilizer to the road bed at a rate of one pound of the soil stabilizer per every 9-18 square yards of road surface; and (ii) a second step of applying the soil stabilizer to the road bed at a rate of one pound of the soil stabilizer per every 60-160 square yards of road surface.

8. The method of claim 7 wherein the road bed is compacted after each of the steps of applying the soil stabilizer.

9. The method of claim 7 wherein the soil stabilizer is diluted in water before the steps of applying the soil stabilizer.

10. The method of claim 9 wherein the grade and slope of the road bed is finished before the second step of applying the soil stabilizer.

11. The method of claim 10 wherein the road bed is compacted after the second step of applying the soil stabilizer until the surface of the road bed is dry.

12. The method of claim 7 wherein the providing step comprises providing a soil stabilizer comprising about 28.4 percent silicon dioxide by weight and about 8.7 percent sodium oxide by weight in an aqueous solution.

13. A method of full-depth road reclamation comprising:

crushing an existing flexible pavement section and predetermined portion of underlying road bed;

pulverizing the crushed flexible pavement section and predetermined portion of underlying road bed;

uniformly blending the pulverized flexible pavement section and predetermined portion of underlying road bed;

providing a soil stabilizer comprising 28-30 percent silicon dioxide by weight and 8.5-9.5 percent sodium oxide by weight in an aqueous solution; and applying the soil stabilizer to the uniformly blended flexible pavement section and predetermined portion of underlying road bed at a rate of about 0.005 gallons of the soil stabilizer per square yard per inch thickness of road bed.

14. A kit for full-depth road reclamation comprising:

a soil stabilizer comprising 28-30 percent silicon dioxide by weight and 8.5-9.5 percent sodium oxide by weight in an aqueous solution; and instructions for a method of full-depth road reclamation, the method comprising:

(i) crushing an existing flexible pavement section and predetermined portion of underlying road bed;

(ii) pulverizing the crushed flexible pavement section and predetermined portion of underlying road bed;

(iii) uniformly blending the pulverized flexible pavement section and predetermined portion of underlying road bed;

(iv) providing a soil stabilizer comprising 28-30 percent silicon dioxide by weight and 8.5-9.5 percent sodium oxide by weight in an aqueous solution; and (v) applying the soil stabilizer to the uniformly blended flexible pavement section and predetermined portion of underlying road bed in two steps, the steps comprising:

(a) a first step of applying a mixture of the crushed, pulverized, and uniformly blended flexible pavement section and underlying road bed and the soil stabilizer to the road bed at a rate of one gallon of the soil stabilizer per every 42-74 square yards of road surface; and (b) a second step of applying the soil stabilizer to the road bed at a rate of one gallon of the soil stabilizer per every 275-700 square yards of road surface.

* * * * *